United States Patent [19]
Kunz

[11] Patent Number: 5,998,760
[45] Date of Patent: Dec. 7, 1999

[54] TORCH FOR SHIELDED ARC WELDING

[75] Inventor: Erwin Kunz, Oberengstringen, Switzerland

[73] Assignee: Mechafin AG, Geroldswil, Switzerland

[21] Appl. No.: 08/987,945

[22] Filed: Dec. 10, 1997

[30] Foreign Application Priority Data

Dec. 12, 1996 [EP] European Pat. Off. ............... 96119911

[51] Int. Cl.[6] ................. B23K 9/12; B23K 9/10
[52] U.S. Cl. .................. 219/137.31; 219/137.31
[58] Field of Search ............ 219/137.62, 137.31

[56] References Cited

U.S. PATENT DOCUMENTS

| | | | |
|---|---|---|---|
| 3,689,733 | 9/1972 | Matasoviv | 219/130 |
| 4,313,046 | 1/1982 | Henry et al. | 219/137.62 |
| 5,349,158 | 9/1994 | Mari | 219/137.62 |
| 5,611,951 | 3/1997 | Kunz et al. | 219/137.62 |
| 5,841,105 | 11/1998 | Haczynski et al. | 219/137.31 |
| 5,866,874 | 2/1999 | Haczynski et al. | 219/137.31 |

FOREIGN PATENT DOCUMENTS

| | | |
|---|---|---|
| 0353098 | 1/1990 | European Pat. Off. . |
| 3376015 | 7/1990 | European Pat. Off. . |
| 0590728 | 4/1994 | European Pat. Off. . |
| 2728819 | 7/1996 | France . |

*Primary Examiner*—Patrick Ryan
*Assistant Examiner*—Anjan Dey
*Attorney, Agent, or Firm*—Jacox, Meckstroth & Jenkins

[57] ABSTRACT

A torch comprises inner parts carrying the welding current. The inner parts are enclosed by a nozzle, an intermediate member and an outer neck section. The intermediate member is connected to the outer neck section with a left handed internal screw and to the nozzle with a right handed external screw. The inner parts are surrounded by electrically insulating tubes for preventing an electrical breakthrough. At least an intermediate one of the insulating tubes is coated with a thermally conducting paste for providing good heat conduction between the outer and inner parts.

28 Claims, 2 Drawing Sheets

TORCH FOR SHIELDED ARC WELDING

This application claims the priority of the European application 96119911.4, filed on Dec. 12, 1996, the disclosure of which is incorporated herein by reference in its entirety.

BACKGROUND OF THE INVENTION

The invention relates to a torch for shielded arc welding comprising an inner part for carrying the current and an outer part and isolation means arranged therebetween.

Such torches are e.g. used for MIG arc welding and are usually exposed to high temperatures. Their tip and gas nozzle must therefore be designed to carry off heat efficiently. A device with water cooling is disclosed in European patent application EP 376 015. On the other hand, the torches should be compact and slim such that they can be used in constricted areas. This compact design makes it difficult to provide for the necessary heat removal.

BRIEF SUMMARY OF THE INVENTION

Hence, it is a general object of the invention to provide a compact torch with efficient heat removal.

Now, in order to implement these and still further objects of the invention, which will become more readily apparent as the description proceeds, the torch is manifested by the features that it comprises an inner part for carrying a current with an inner neck section and a contact tip for guiding a wire; an outer part with an outer neck section having an external thread, an intermediate member adjacent to said outer neck section, said intermediate member having an rearward internal thread threaded into said external thread of said outer neck section and a gas nozzle adjacent to said intermediate member; and insulating means arranged between said inner part and said outer part for electrically insulating said inner part and said outer part.

The arrangement of the external and internal threads on the neck section and the intermediate member, respectively, obviates the need for a nut as it is used in conventional designs for mounting the intermediate member to the outer neck section, thereby making the design more compact.

At the same time, a good thermal and mechanical connection between intermediate member and outer neck section is established, which also allows a more compact design of the torch by making tolerances smaller. The thermal connection is improved because air gaps are avoided or at least reduced. The small tolerances also establish a well defined position of the welding head, which makes automatic welding easier.

A torch according to the invention can be disassembled easily because all parts subject to regular maintenance can be screwed onto the torch from its forward end.

Preferably, the intermediate member is further provided with a forward external threading for receiving the nozzle, which again establishes a good thermal and mechanical contact. For making assembly and disassembly easier, the screwing direction of the forward external threading should be opposite to the one of the rearward internal threading of the intermediate member, such that the two connections can be tightened and loosened separately.

In a further aspect of the invention, a compact design and good thermal conductivity are achieved by a torch comprising an inner part for carrying a current with a cooled inner neck section and a contact tip for guiding a wire; an outer part with an outer neck section, a head section forming a gas nozzle; insulating means arranged between said inner part and said outer part for electrically insulating said inner part from said outer part; and at least one layer of thermally conducting paste arranged in contact with said insulating means. The thermally conducting paste establishes a good thermal conduction between the inner and outer parts by bridging the gaps between these parts and the electrical insulator arranged between them. This allows to use insulators with high voltage breakdown but good thermal conductivity, such as ceramics, even if they have a rough surface.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
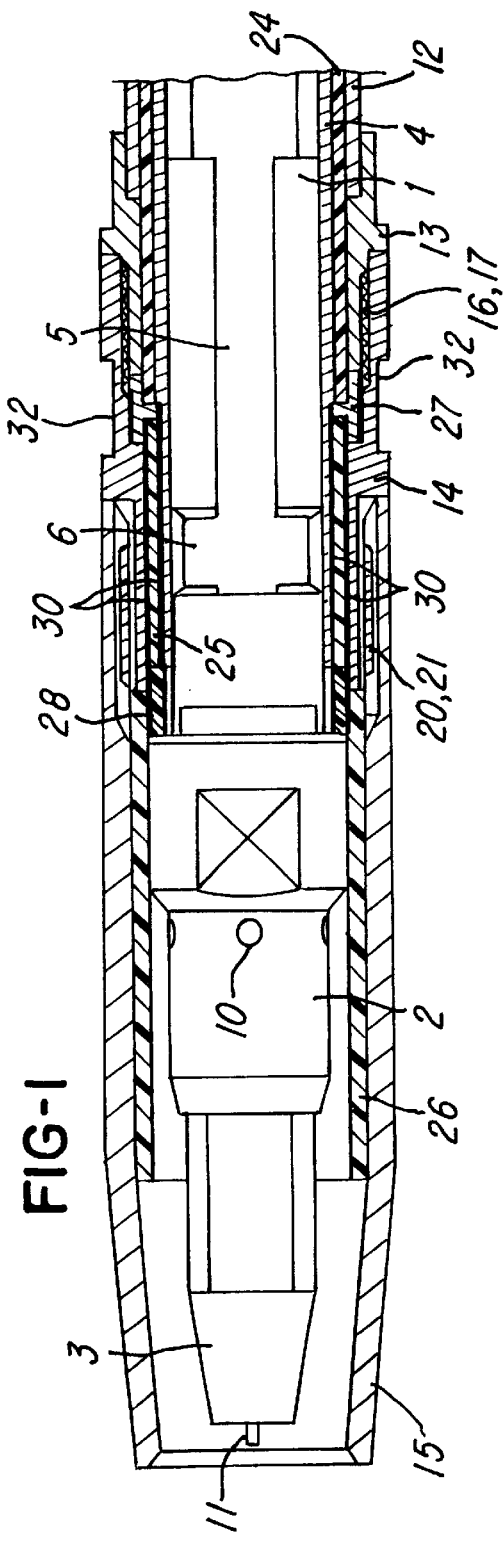
FIG. 1 is an embodiment of a torch according to the invention.
Figure 2:
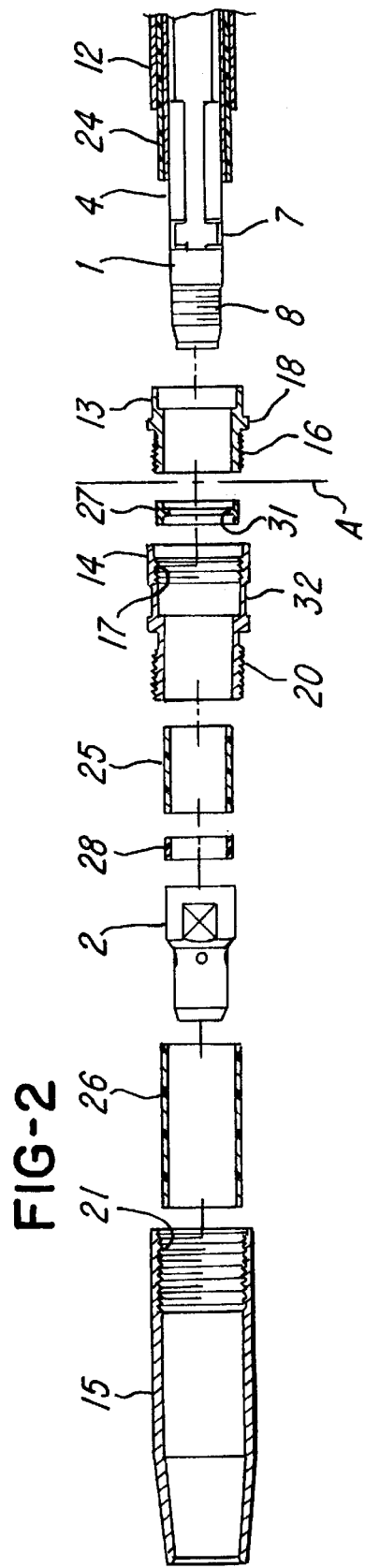
FIG. 2 is an exploded view of the torch of FIG. 1 without the tip.

The basic set-up of an embodiment of a torch according to the invention is illustrated in FIGS. 1 and 2. In these drawings, most of the parts conducting the welding current are shown in lateral view while the remaining parts are shown in sectional view.

The parts carrying the welding current are arranged in the core of the torch. They comprise an inner neck section 1, 4, a contact tip holder 2, and the tip 3 for guiding a welding wire 11. All these parts form a central channel (not shown) for receiving welding wire 11. Inner neck section 1,4 and tip 3 are made of copper for good thermal and electric conductivity, and tip holder 2 is made of copper or brass.

Inner neck section 1, 4 extends through the neck of the torch up to its head. It is tube shaped for receiving the shielding gas and the welding wire. A core part 1 of the inner neck section forms water channels 5, 6 on its outer side for circulating cooling water. A cylindrical mantel part 4 of the inner neck section abuts firmly on core part 1 and closes the channels 5, 6 on their outer side. Mantel part 4 is lathed off at its forward end, where it has a thickness of only 0.5 mm, which provides a good thermal conduction to the outer parts.

An external threading 8 is arranged at the forward end of inner neck section 1, 4 for receiving tip holder 2. Tip holder 2 has an axial channel (not shown) for the welding wire as well as radial ducts 10 for the shielding gas, through which the gas enters the gap between tip 3 and nozzle 15. An internal threading (not shown) is arranged at the forward end of tip holder 2 for receiving tip 3.

The outer metal parts of the torch are electrically insulated from the inner parts and arranged on its outside. They comprise an outer neck portion 12 with a socket 13, an intermediate member 14 and the nozzle 15. Nozzle 15 is of copper, the remaining parts of brass or copper.

Outer neck section 12 has the shape of a tube and extends along an outer side of the torch's neck up to its head. Socket 13 is integrally welded to the forward end of this tube.

Socket 13 of outer neck section 12 has an external threading 16, which is engaged by a rearward internal threading 17 of intermediate member 14. A ledge 18 of socket 13 forms a well defined stop for intermediate member 14.

Intermediate member 14 has substantially the shape of a cylinder and is provided with a forward external threading 20. Nozzle 15 is screwed to this forward external threading 20 and is therefore provided with a corresponding internal threading 21.

Insulating means are arranged between the metal outer and inner parts of the torch for providing electric insulation. They comprise a rear tube 24, an intermediate tube 25 and a front tube 26 as well as insulating rings 27 and 28.

Rear tube 24 consists of plastic, preferably PTFE, and insulates inner neck section 1, 4 against outer neck section 12. On its forward end, it extends somewhat over socket 13 of outer neck section 12 but is shorter than inner neck section 1, 4.

Intermediate tube 25 is arranged between the forward end of inner neck section 1, 4, which extends beyond intermediate member 14 into the torch head, and intermediate section 14. Intermediate tube 25 is a ceramic tube.

A first ring 27 is arranged in an area between intermediate tube 25 and rear tube 24. It comprises a T-shaped cross section and forms an inner, circumferential protrusion, which extends into a gap between intermediate tube 25 and rear tube 24. First ring 27 is preferably made of PTFE and prevents electric break through in the area between tubes 24 and 25.

A second plastic ring 28 is arranged at the forward end of intermediate tube 25 and is pressed against the same by tip holder 2. By this pressure of tip holder 2, the insulating parts are pressed against each other, which prevents gaps and increases the break through voltage.

Forward tube 26 is arranged on an inner side of nozzle 15 and insulates the same, especially against tip holder 2 and tip 3.

For improving thermal conductivity between intermediate member 14 and cooled inner neck section 1, 4, the inner and outer sides of intermediate insulating tube 25 and of rings 27, 28 are provided with a layer of thermally conducting paste 30, such as it is e.g. used for connecting semiconductor devices to heat sinks. It has been found that such paste also reduces the danger of electrical break through.

For maintenance, all parts on the left side of line A of FIG. 2 can be disassembled and reassembled easily.

Assembly starts from the neck section consisting of inner and outer neck sections 1, 4 and socket 13. In a first step, forward end section 7 of inner neck section 1, 4 is covered with a layer of thermally conducting paste 30. Then, T-shaped first ring 27 and intermediate insulating tube 25 are slid from the front end onto the inner neck section. These parts are also covered with a layer of thermally conducting paste 30, then intermediate member 14 is slid on and screwed into the left handed threading 16. In a next step, second ring 28 is covered with thermally conducting paste and also slid onto the inner neck section. Now, tip holder 2 and tip 3 are screwed on. Then, forward tube 26 is slid into nozzle 25 from its back end, and the two parts are screwed into the right handed threading 20.

For disassembly, the same steps are taking in opposite order.

Therefore, the intermediate insulating tube 25, the face 7 of the inner neck section, and the inner face of intermediate member 14 can be accessed easily for maintenance. This is important because these parts must be kept in excellent condition for establishing good thermal conduction.

The torch is very slim, which is of substantial advantage when welding in places that are difficult to access. This is a consequence of the intermediate member 14 being screwed onto the outside of the neck portion, such that no coupling nut is required. Faces 32 are provided on intermediate member 14 for engagement by a wrench. These faces are formed by opposite recesses milled into the outer surface of the intermediate member. This avoids protruding parts in this section of the torch.

The outer diameter of the torch can further be decreased because of the efficient heat conduction between the cooled, inner neck portion and the intermediate member because heat from nozzle 15, which contacts intermediate member 14, can be carried off quickly to the inner neck portion.

Figure 3:
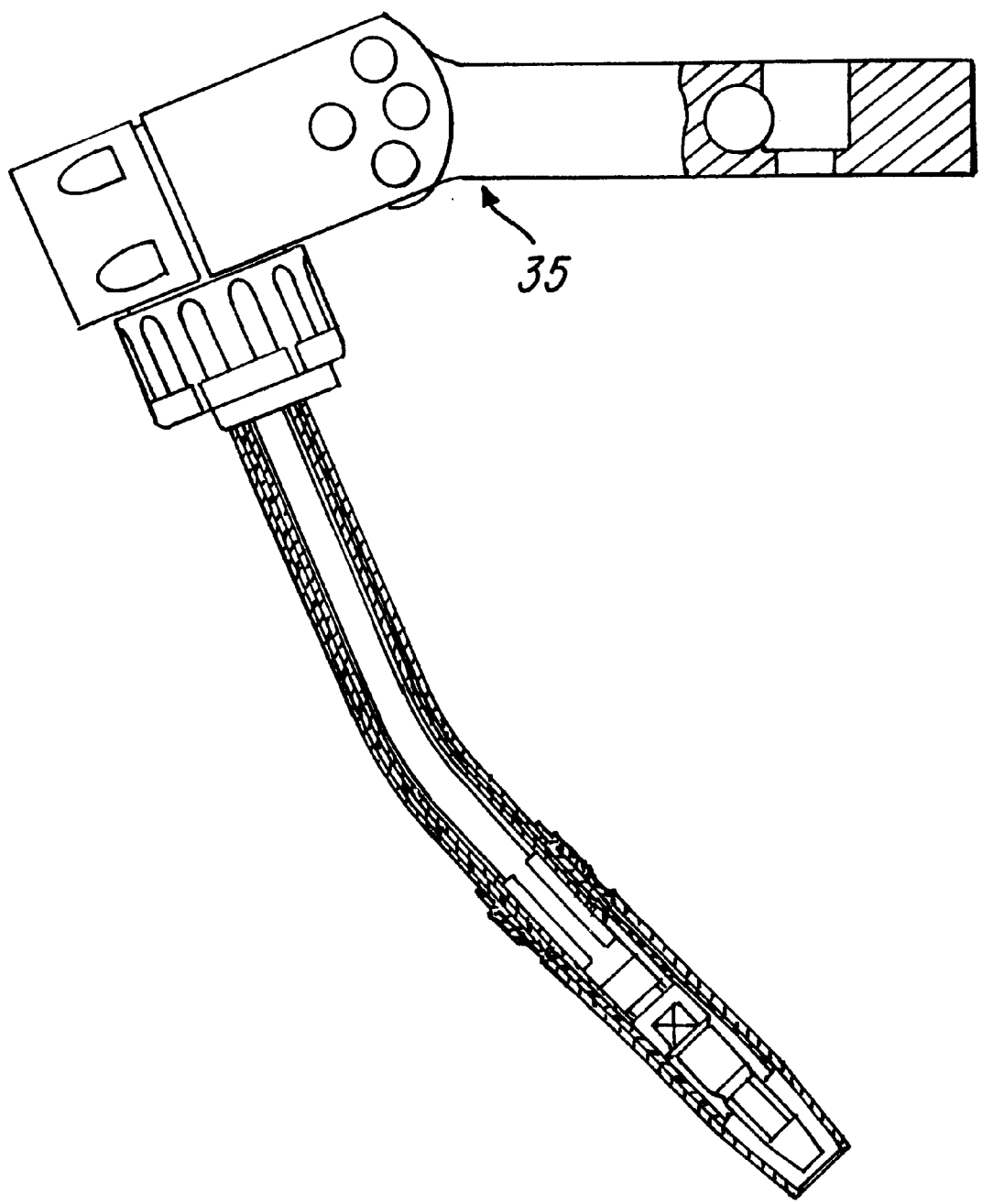
FIG. 3 shows the torch of FIG. 1 on a robot arm.

The torch of FIG. 1 is suited for hand held apparatus as well as for robots. FIG. 3 shows a possible arrangement of the torch on a robot arm 35. In this embodiment, the neck is bent, but it can also be straight.

Due to its slim design, the torch according to the invention is a versatile and powerful tool for hand and robot welding. This is reached by the design of intermediate member 14, but also by the arrangement of the insulating tubes and the application of thermally conducting paste 30. These means can, however, also be applied separately.

While there are shown and described presently preferred embodiments of the invention, it is to be distinctly understood that the invention is not limited thereto but may be otherwise variously embodied and practised within the scope of the following claims.

I claim:

1. A torch for shielded arc welding comprising:

(a) an inner part for carrying a welding current with an inner neck section and a contact tip for guiding a wire;

(b) an outer part with
      an outer neck section having a male thread;
      an intermediate member adjacent to said outer neck section, said intermediate member having a female thread threaded onto said male thread of said outer neck section and
      a gas nozzle adjacent to said intermediate member; and (c) insulating means arranged between said inner part and said outer part for electrically insulating said inner part from said outer part.

2. The torch of claim 1, wherein said intermediate member has a male thread, and wherein said gas nozzle has a female thread threaded onto said male thread of said intermediate member.

3. The torch of claim 2, wherein said male thread of said intermediate member has a screw direction opposite to said female thread of said intermediate member.

4. The torch of claim 1, wherein said inner neck section comprises at least one water cooling conduit.

5. The torch of claim 1, wherein said inner neck section extends axially at least to said intermediate member.

6. The torch of claim 5 further comprising a first electrically insulating tube arranged between said inner neck section and said intermediate member.

7. The torch of claim 6, wherein said first insulating tube is of a ceramic material.

8. A torch for shielded arc welding comprising:

(a) an inner part for carrying a welding current with an inner neck section and a contact tip for guiding a wire, (b) an outer part with
      an outer neck section having a male thread, an intermediate member adjacent to said outer neck section, said intermediate member having a female thread threaded onto said male thread of said outer neck section, and a gas nozzle adjacent to said intermediate member; and (c) insulating means arranged between said inner part and said outer part for electrically insulating said inner part from said outer part;

wherein said inner neck section extends axially at least to said intermediate member;

a first electrically insulating tube arranged between said inner neck section and said intermediate member;

a second electrically insulating tube arranged between said inner neck section and said outer neck section, and an insulating ring arranged in an area between said first and second electrically insulating tubes, wherein said insulating ring has a circumferential protrusion arranged at its inner side extending into a between said first and second electrically insulating tubes.

9. The torch of claim 6 comprising a layer of thermally-conductive paste between said inner neck section and said first insulating tube.

10. The torch of claim 6 comprising a layer of thermally-conductive paste between said first insulating tube and said intermediate member.

11. The torch of claim 6, wherein said first insulating tube can be slid over a tip side oriented end of said inner neck portion.

12. A torch for shielded arc welding comprising:

(a) an inner part for carrying a welding current with
an inner neck section and
a contact tip for guiding a wire, (b) an outer part with
an outer neck section having a male thread,
an intermediate member adjacent to said outer neck section, said intermediate member having a female thread threaded onto said male thread of said outer neck section, and
a gas nozzle adjacent to said intermediate member; and (c) insulating means arranged between said inner part and said outer part for electrically insulating said inner part from said outer part;

wherein said inner neck section extends axially at least to said intermediate member;

a first electrically insulating tube arranged between said inner neck section and said intermediate member, wherein said gas nozzle contacts an outer surface of said intermediate member in an area around said first insulating tube.

13. A torch for shielded arc welding comprising:

(a) an inner part for carrying a welding current with an inner neck section and a contact tip for guiding a wire;

(b) an outer part with
an outer neck section having a male thread;
an intermediate member adjacent to said outer neck section, said intermediate member having a female thread threaded onto said male thread of said outer neck section and
a gas nozzle adjacent to said intermediate member; and (c) insulating means arranged between said inner part and said outer part for electrically insulating said inner part from said outer part;

a holder for said tip, mounted between said inner neck section and said tip, wherein said holder comprises at least one outlet for shielding gas.

14. A torch for shielded arc welding comprising:

(a) an inner part for carrying a welding current with an inner neck section and a contact tip for guiding a wire;

(b) an outer part with
an outer neck section having a male thread;
an intermediate member adjacent to said outer neck section, said intermediate member having a female thread threaded onto said male thread of said outer neck section and
a gas nozzle adjacent to said intermediate member; and (c) insulating means arranged between said inner part and said outer part for electrically insulating said inner part from said outer part;

a holder for said tip, mounted between said inner neck section and said tip, wherein said holder comprises at least one outlet for shielding gas; and a first electrically insulating tube arranged between said inner neck section and said intermediate member, wherein said holder comprises means for exerting an axial pressure onto said first insulating tube.

15. A torch for shielded arc welding comprising:

(a) an inner part for carrying a welding current with an inner neck section and a contact tip for guiding a wire;

(b) an outer part with
an outer neck section having a male thread;
an intermediate member adjacent to said outer neck section, said intermediate member having a female thread threaded onto said male thread of said outer neck section and
a gas nozzle adjacent to said intermediate member; and (c) insulating means arranged between said inner part and said outer part for electrically insulating said inner part from said outer part;

wherein a neck side oriented end of said intermediate member abuts on a ledge of said outer neck section.

16. A torch for shielded arc welding comprising:

(a) an inner part for carrying a welding current with an inner neck section and a contact tip for guiding a wire;

(b) an outer part with
an outer neck section having a male thread;
an intermediate member adjacent to said outer neck section, said intermediate member having a female thread threaded onto said male thread of said outer neck section and
a gas nozzle adjacent to said intermediate member; and (c) insulating means arranged between said inner part and said outer part for electrically insulating said inner part from said outer part;

comprising a third electrically insulating tube arranged in said gas nozzle.

17. A torch for shielded arc welding comprising:

(a) an inner part for carrying a welding current with an inner neck section and a contact tip for guiding a wire;

(b) an outer part with
an outer neck section having a male thread;
an intermediate member adjacent to said outer neck section, said intermediate member having a female thread threaded onto said male thread of said outer neck section and
a gas nozzle adjacent to said intermediate member; and (c) insulating means arranged between said inner part and said outer part for electrically insulating said inner part from said outer part;

wherein said intermediate member has a substantially cylindrical outer surface with two recesses formed therein, which two recesses form flat faces for being engaged by a wrench.

18. A torch for shielded arc welding comprising:
(a) an inner part for carrying a welding current with an inner neck section and a contact tip for guiding a wire;
(b) an outer part with
an outer neck section having a male thread;
an intermediate member adjacent to said outer neck section, said intermediate member having a female thread threaded onto said male thread of said outer neck section and
a gas nozzle adjacent to said intermediate member; and
(c) insulating means arranged between said inner part and said outer part for electrically insulating said inner part from said outer part;
wherein an outer diameter of said intermediate member does not exceed a maximum outer diameter of said outer parts.

19. A torch for shielded arc welding comprising:
(a) an inner part for carrying a welding current with
a cooled inner neck section and
a contact tip for guiding a wire;
(b) an outer part with
an outer neck section,
a head section forming a gas nozzle,
(c) insulating means arranged between said inner part and said outer part for electrically insulating said inner part from said outer part; and
(d) at least one layer of thermally-conductive paste arranged in contact with said insulating means.

20. The torch of claim 19, wherein said layer of thermally-conductive paste is arranged between said insulating means and said inner part.

21. The torch of claim 19, wherein said layer of thermally-conductive paste is arranged between said insulating means and said outer part.

22. The torch of claim 19, wherein said head section comprises:
a first part being screwed from a tip side oriented end onto said neck section, and
a second part forming said nozzle and being mounted to a tip side oriented end of said first part.

23. A torch for arc welding comprising:
an inner part for carrying welding current;
an outer part; and
at least one layer of thermally-conductive paste situated between said inner part and outer part.

24. The torch of claim 23, wherein said torch further comprises:
an insulator situated between said inner part and outer part, said at least one layer of thermally-conductive paste being situated on said insulator.

25. The torch of claim 24, wherein said insulator is ceramic.

26. A method for improving the thermal conductivity between an inner part of an arc welding torch and an outer part of said arc welding torch, said method comprising the step of:
situating a thermally-conductive paste between said inner part and said outer part.

27. The method as recited in claim 26, wherein said situating step further comprises the steps of:
positioning an insulating part between said inner part and said outer part;
situating said thermally-conductive paste on said insulating part.

28. The method as recited in claim 27, wherein said positioning step further comprises the step of:
positioning a ceramic insulating part between said inner part and said outer part.

* * * * *